United States Patent
Guo et al.

(10) Patent No.: US 11,799,369 B2
(45) Date of Patent: Oct. 24, 2023

(54) CURRENT SENSING WITH CAPACITIVE COMPENSATION

(71) Applicant: TEXAS INSTRUMENTS INCORPORATED, Dallas, TX (US)

(72) Inventors: Song Guo, Plano, TX (US); Saurav Bandyopadhyay, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 71 days.

(21) Appl. No.: 17/512,842

(22) Filed: Oct. 28, 2021

(65) Prior Publication Data

US 2022/0302837 A1  Sep. 22, 2022

Related U.S. Application Data

(60) Provisional application No. 63/175,632, filed on Apr. 16, 2021, provisional application No. 63/163,370, filed on Mar. 19, 2021.

(51) Int. Cl.
*H02M 3/158* (2006.01)
*H02M 1/00* (2006.01)

(52) U.S. Cl.
CPC ......... *H02M 1/0009* (2021.05); *H02M 3/158* (2013.01)

(58) Field of Classification Search
CPC ..... H02M 1/0009; H02M 3/156; H02M 3/158
See application file for complete search history.

(56) References Cited

U.S. PATENT DOCUMENTS

| 8,072,200 | B1* | 12/2011 | Qiu | H02M 3/1584 |
| | | | | 323/282 |
| 2006/0061340 | A1* | 3/2006 | Wang | H02M 3/156 |
| | | | | 323/267 |
| 2014/0347078 | A1 | 11/2014 | Qin | |
| 2018/0219484 | A1* | 8/2018 | Mercer | H02M 3/158 |

FOREIGN PATENT DOCUMENTS

JP  2019149614 A  9/2019

OTHER PUBLICATIONS

International Search Report; PCT/US2022/021075; dated Jun. 23, 2022.

* cited by examiner

*Primary Examiner* — Alex Torres-Rivera
(74) *Attorney, Agent, or Firm* — Ray A. King; Frank D. Cimino

(57) ABSTRACT

A current sense circuit includes a sense amplifier, a current mirror circuit, a resistor, a low-pass filter, and a capacitor. The sense amplifier is adapted to be coupled to a switching transistor of a DC-DC converter. The current mirror circuit is coupled to the sense amplifier, and is configured to generate a sense current proportional to a current flowing through the switching transistor. The resistor is coupled to the current mirror circuit, and is configured to generate a sense voltage based on the sense current. The low-pass filter is coupled to the resistor, and is configured to average the sense voltage over an averaging interval. The capacitor is coupled to the resistor, and is configured to store the sense voltage in a blanking interval that precedes the averaging interval, and provide a compensation current in the averaging interval.

18 Claims, 5 Drawing Sheets

CURRENT SENSING WITH CAPACITIVE COMPENSATION

CROSS-REFERENCE TO RELATED APPLICATIONS

This application claims priority to U.S. Provisional Application No. 63/163,370, filed Mar. 19, 2021, entitled "Capacitive Compensation for Improving Current Sensing Accuracy in Buck Converter Design," and to U.S. Provisional Application No. 63/175,632, filed Apr. 16, 2021 entitled "Capacitive Compensation to Improve Current Sensing Accuracy in Buck Converter," which are hereby incorporated by reference in their entirety.

BACKGROUND

A switch-mode power supply is an electronic circuit that converts an input direct current (DC) supply voltage into one or more DC output voltages that are higher or lower in magnitude than the input DC supply voltage. A switch-mode power supply that generates an output voltage lower than the input voltage is termed a buck or step-down converter. A switch-mode power supply that generates an output voltage higher than the input voltage is termed a boost or step-up converter. Current sensing circuitry may be coupled to the switch-mode power supply to measure the current flowing from the power supply to a load circuit.

SUMMARY

In one example, a current sense circuit includes a sense amplifier, a current mirror circuit, a buffer amplifier, a switch, and a compensation capacitor. The sense amplifier includes an input and an output. The input is adapted to be coupled to a switching transistor of a DC-DC converter. The current mirror circuit is coupled to the output of the sense amplifier. The buffer amplifier includes and input and an output. The input of the buffer amplifier is coupled to the current mirror circuit. The switch includes a first terminal and a second terminal. The first terminal is coupled to the output of the buffer amplifier. The second terminal is coupled to the input of the buffer amplifier. The compensation capacitor is coupled to the second terminal of the switch.

In another example, a current sense circuit includes a sense amplifier, a current mirror circuit, a resistor, a low-pass filter, and a capacitor. The sense amplifier is adapted to be coupled to a switching transistor of a DC-DC converter. The current mirror circuit is coupled to the sense amplifier, and is configured to generate a sense current proportional to a current flowing through the switching transistor. The resistor is coupled to the current mirror circuit, and is configured to generate a sense voltage based on the sense current. The low-pass filter is coupled to the resistor, and is configured to average the sense voltage over an averaging interval. The capacitor is coupled to the resistor, and is configured to store the sense voltage in a blanking interval that precedes the averaging interval, and provide a compensation current in the averaging interval.

In a further example, a DC-DC converter includes a switching transistor and a current sense circuit. The current sense circuit is coupled to the switching transistor, and is configured to sense current flow in the switching transistor. The current sense circuit includes a sense amplifier, a current mirror circuit, a resistor, a low-pass filter, a capacitor, and a buffer amplifier. The sense amplifier is coupled to the switching transistor. The current mirror circuit is coupled to the sense amplifier, and is configured to generate a sense current proportional to a current flowing through the switching transistor. The resistor is coupled to the current mirror circuit, and is configured to generate a sense voltage based on the sense current. The low-pass filter is coupled to the resistor, and is configured to average the sense voltage over an averaging interval. The capacitor is coupled to the resistor, and is configured to store the sense voltage in a blanking interval that precedes the averaging interval, and provide a compensation current in the averaging interval. The buffer amplifier is coupled to the resistor and the capacitor, and is configured to charge the capacitor during the blanking interval.

DETAILED DESCRIPTION

A current sense circuit may measure load current by sensing current flowing in a switching transistor (e.g., the low-side switching transistor) of a DC-DC converter (i.e., sensing the current flowing in the inductor of the DC-DC converter). A sense current that is proportional to the current flowing in the switching transistor is converted to a sense voltage and averaged over time. The average sense voltage may be expressed as:

$$Vavg = G*Iavg - G*\frac{Iripple}{2} + G*Iripple*\frac{Toff - Tblank}{2*Toff} \quad (1)$$
$$= G*Iavg - G*Iripple*\frac{Tblank}{2*Toff}$$

where $Iavg$ is the average inductor current (load current);

$Iripple$ is ripple current;

$G$ is sensing gain;

$Toff$ is off time (low–side switching transistor on time; and $Tblank$ is the time of the blanking interval.

When the low-side switching transistor is turned on, averaging of sense voltage is disabled for a time (a blanking interval) to allow sensed current to settle. Because of the blanking interval, the sensed load current is lower than the actual load current. The sensing error is:

$$G * Iripple * \frac{Tblank}{2 * Toff}.$$

Figure 1:
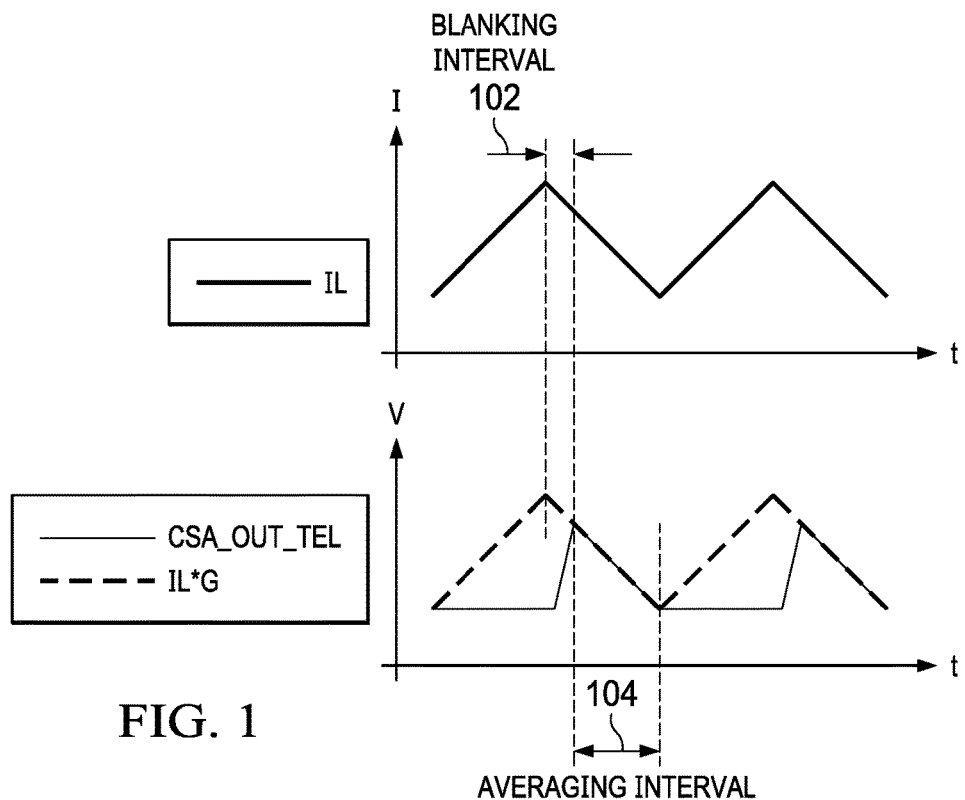
FIG. 1 shows a graph of current sensing with error caused by a blanking interval.

FIG. 1 shows a graph of current sensing in a DC-DC converter with error caused by a blanking interval. In the graph of current, inductor current (IL) increases when the high-side switching transistor is turned on and the low-side switching transistor is turned off. IL decreases when the low-side switching transistor is turned on and the high-side switching transistor is turned off. In the graph of voltage, gained inductor current (IL*G) follows IL. When the low-side switching transistor is turned on, the blanking interval 102 is initiated, and after the blanking interval 102 (in the averaging interval 104), the sense voltage CSA_OUT_TEL is switched to an averaging filter for generation of a voltage representing the average load current. The blanking interval 102 reduces the value of the average sensed current, causing a sensing error. The sensing error can be significant, especially for high frequency and high duty cycle applications where Toff (the low-side switching transistor on-time) is short. For example, sensing error due to blanking may exceed 10% in some circumstances.

Examples of the of the current sensing circuit described herein include circuitry that compensates for the blanking interval to improve current sensing accuracy. For example, current sensing error may be less than one percent in DC-DC converters that include the current sensing circuit with blanking interval compensation.

Figure 2:
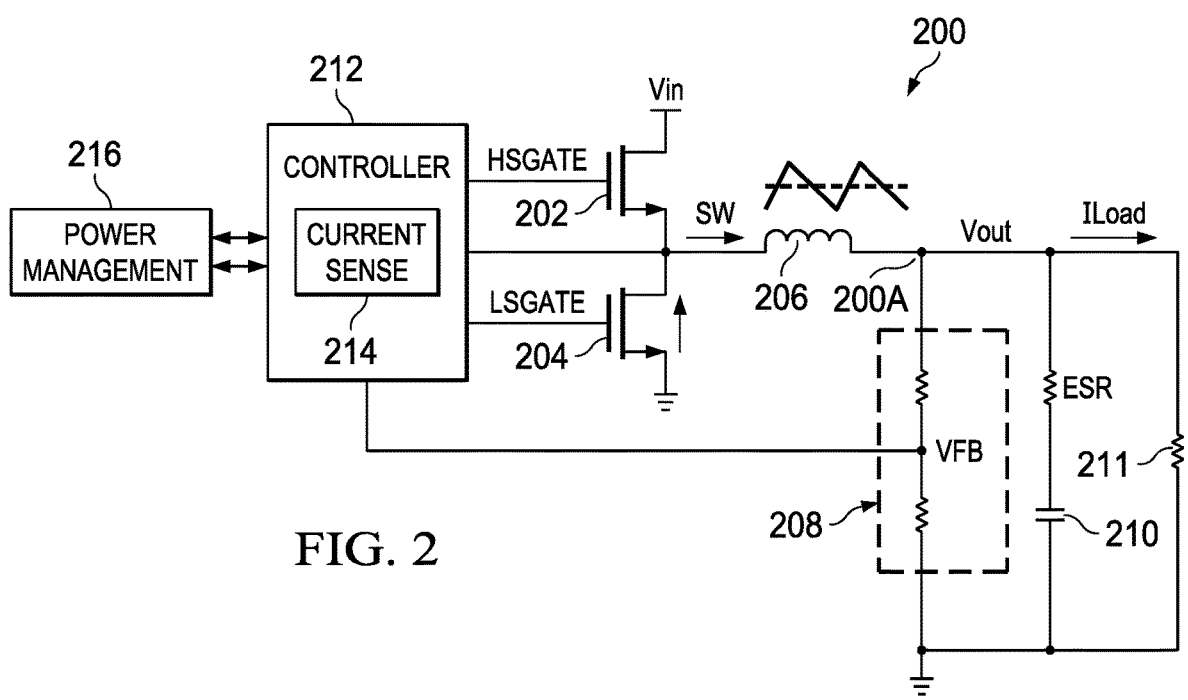
FIG. 2 shows a block diagram of an example DC-DC converter that includes current sensing with compensation for blanking.

FIG. 2 shows a block diagram of an example DC-DC converter 200 that includes current sensing with compensation for blanking. The DC-DC converter 200 is illustrated as a buck converter, but may a boost converter, a buck-boost converter, or other type of DC-DC converter. The DC-DC converter 200 includes a high-side switching transistor 202, a low-side switching transistor 204, an inductor 206, a voltage divider 208, an output capacitor 210, and a controller 212. The DC-DC converter 200 powers a load 211, and communicates with a power management system 216 in some implementations.

The controller 212 controls the high-side switching transistor 202 and the low-side switching transistor 204 to charge and discharge the inductor 206 (via the control signals HSGATE and LSGATE). When the high-side switching transistor 202 is turned on and the low-side switching transistor 204 is turned off, current flows from through the high-side switching transistor 202 to charge the inductor 206. When the low-side switching transistor 204 is turned on and the high-side switching transistor 202 is turned off, current flows through the low-side switching transistor 204 as the inductor 206 is discharged. Current flowing from the inductor 206 charges the output capacitor 210 and powers the load 211.

The voltage divider 208 is coupled to the output 200A of the DC-DC converter 200. The voltage divider 208 divides the output voltage (Vout) of the DC-DC converter 200 to generate a feedback voltage (VFB) that is proportional to Vout. The controller 212 compares VFB to a reference voltage to generate an error signal used to control the high-side switching transistor 202 and low-side switching transistor 204.

The controller 212 also included current sense circuit 214. The current sense circuit 214 is coupled to the low-side switching transistor 204 for measurement of the current flowing through the inductor 206 (and into the output capacitor 210 and the load 211) as the inductor 206 is discharged. The current sense circuit 214 includes circuitry to compensate for the blanking interval applied at turn-on of the low-side switching transistor 204, and improve the accuracy of load current sensing.

The controller 212 may communicate with the power management system 216 via a serial bus (e.g., a power management bus). For example, various parameters applied to DC-DC conversion in the DC-DC converter 200 may be received from the power management system 216, and status, including measured load current derived from the current sense circuit 214, may be transmitted to the power management system 216.

Implementations of the DC-DC converter 200 may be used in a wide variety of applications that benefit from accurate current sensing. For example, the DC-DC converter 200 may used in servers, or other types of computers, network attached storage devices, or other electronic systems.

Figure 3:
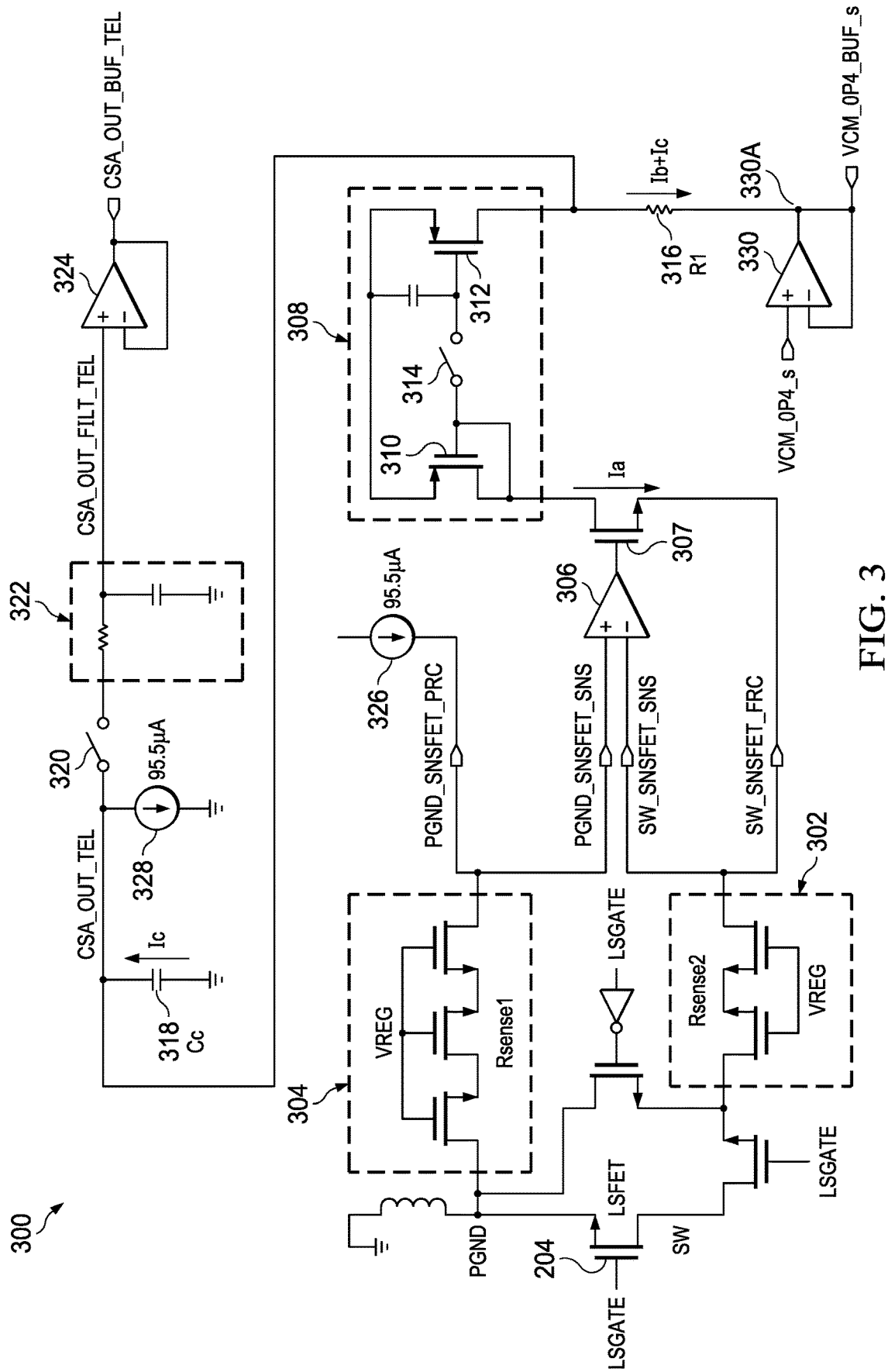
FIG. 3 shows a schematic level diagram for an example current sense circuit that includes compensation for blanking.

FIG. 3 shows a schematic level diagram for an example current sense circuit 300 that includes compensation for blanking. The current sense circuit 300 includes a sense resistor 302, a sense resistor 304, a sense amplifier 306, a current mirror circuit 308, a resistor 316, compensation capacitor 318, and a low-pass filter 322. The sense resistor 304 is coupled to the source of the low-side switching transistor 204, and the sense resistor 302 is coupled to the drain of the low-side switching transistor 204. The inputs of the sense amplifier 306 are coupled to the sense resistor 302 and the sense resistor 304. The output of the sense amplifier 306 is coupled to a pass transistor 307.

When the low-side switching transistor 204 is turned on, the sense amplifier 306 senses the voltage across the low-side switching transistor 204, the sense resistor 302, and the sense resistor 304, and activates the pass transistor 307 to pass a current (Ia) that is proportional to the current flowing through the low-side switching transistor 204. A current source 326 injects an offset current (e.g., 95.5 microamperes) to enable sensing of positive and negative current flow through the low-side switching transistor 204. PGND_SNSFET_PRC represents the path of current to the sense resistor 304, and PGND_SNSFET_SNS represents the sensing path from the sense resistor 304 to the sense amplifier 306. Similarly, SW_SNSFET_FRC represents the path of current to the sense resistor 302, and SW_SNSFET_SNS represents the sensing path from the sense resistor 302 to the sense amplifier 306. When the low-side switching transistor 204 is turned off, the sense resistor 302 is coupled to ground (PGND).

The current mirror circuit 308 includes a transistor 310, a transistor 312, and a switch 314. The switch 314 may be implemented using a field effect transistor (FET) in some examples of the current mirror circuit 308. When the low-side switching transistor 204 is turned on, the 314 is closed, and current Ib flows through the transistor 312. Ib mirrors Ia, and is proportional to the current flowing through the low-side switching transistor 204. The resistor 316 is coupled to the transistor 312 and to the output 330A (a common-mode voltage terminal) of the common-mode voltage buffer amplifier 330. The current Ib flows through the resistor 316 to generate a sense voltage (CSA_OUT_TEL).

A current source 328 is coupled to the resistor 316. The current source 328 sinks a current corresponding to the current injected by the current source 326 at the input of the sense amplifier 306.

The compensation capacitor 318 is coupled to the resistor 316, and the sense voltage charges the compensation capacitor 318. A switch 320 is coupled to the compensation capacitor 318 and the resistor 316, and the low-pass filter 322 is coupled to the switch 320. The switch 320 may be implemented using a FET in some examples of the current sense circuit 300. The switch 320 is open during the blanking interval provided at turn-on of the low-side switching transistor 204 to disable current sensing errors due to ringing caused by the parasitic inductance between the low-side switching transistor 204 and ground. The switch 320 is also open when the low-side switching transistor 204 is turned off. When the blanking interval expires, the switch 320 is closed, and the low-pass filter 322 filters the sense voltage to produce an average sense voltage (CSA_OUT_FLT_TEL) that is output by the buffer amplifier 324

When the switch 320 is closed, current (Ic) flows from the compensation capacitor 318 through the resistor 316 to boost the sense voltage and compensate for the error caused by the blanking interval. Without the compensation capacitor 318, the average sense voltage is as per equation (1). Addition of the compensation capacitor 318 adds a compensation voltage, as per:

$$Vcompensate = R1 * \frac{\Delta V}{\Delta t} * Cc = R1 * G * \frac{Iripple}{Toff} * Cc \quad (2)$$

where:

Cc is the capacitance of the compensation capacitor 318; and

R1 is the resistance of the resistor 316.

The compensation voltage (Vcompensate) is selected to compensate the error in equation (2). By setting Vcompensate equal to the error voltage, Cc may be calculated as:

$$Cc = \frac{Tblank}{2*R1} \quad (3)$$

The compensation capacitor 318 provides a compensation voltage that tracks the error caused by the blanking interval with different values of Iripple and Toff (different input voltages, output voltage, and switching frequencies), and allows the current sense circuit 300 to provide good accuracy in a variety of applications.

Figure 4:
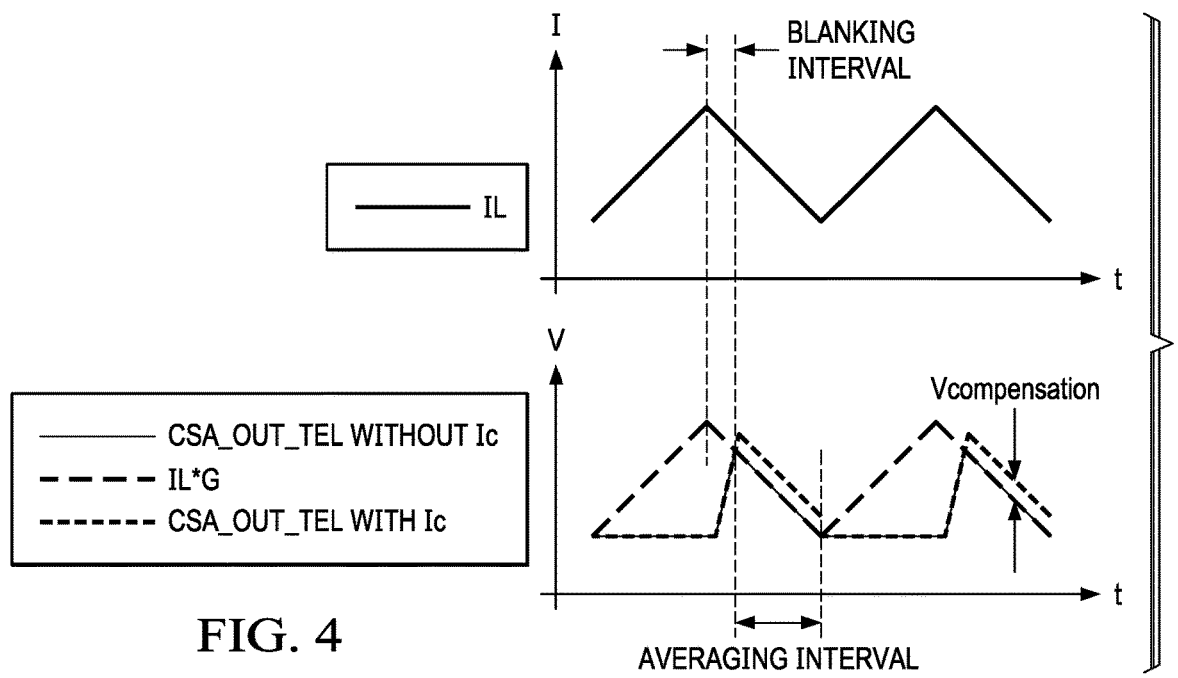
FIG. 4 shows a graph of current sensing with compensation for blanking.

FIG. 4 shows a graph of current sensing in the current sense circuit 300. In FIG. 4, the inductor current, and the sensed voltage (IL*G) are the same as shown in FIG. 1. However, in FIG. 4, the compensation current (Ic), provided by the compensation capacitor 318, boosts the sense voltage during the averaging interval (when the switch 320 is closed) to reduce error in the sensed current.

Figure 5:
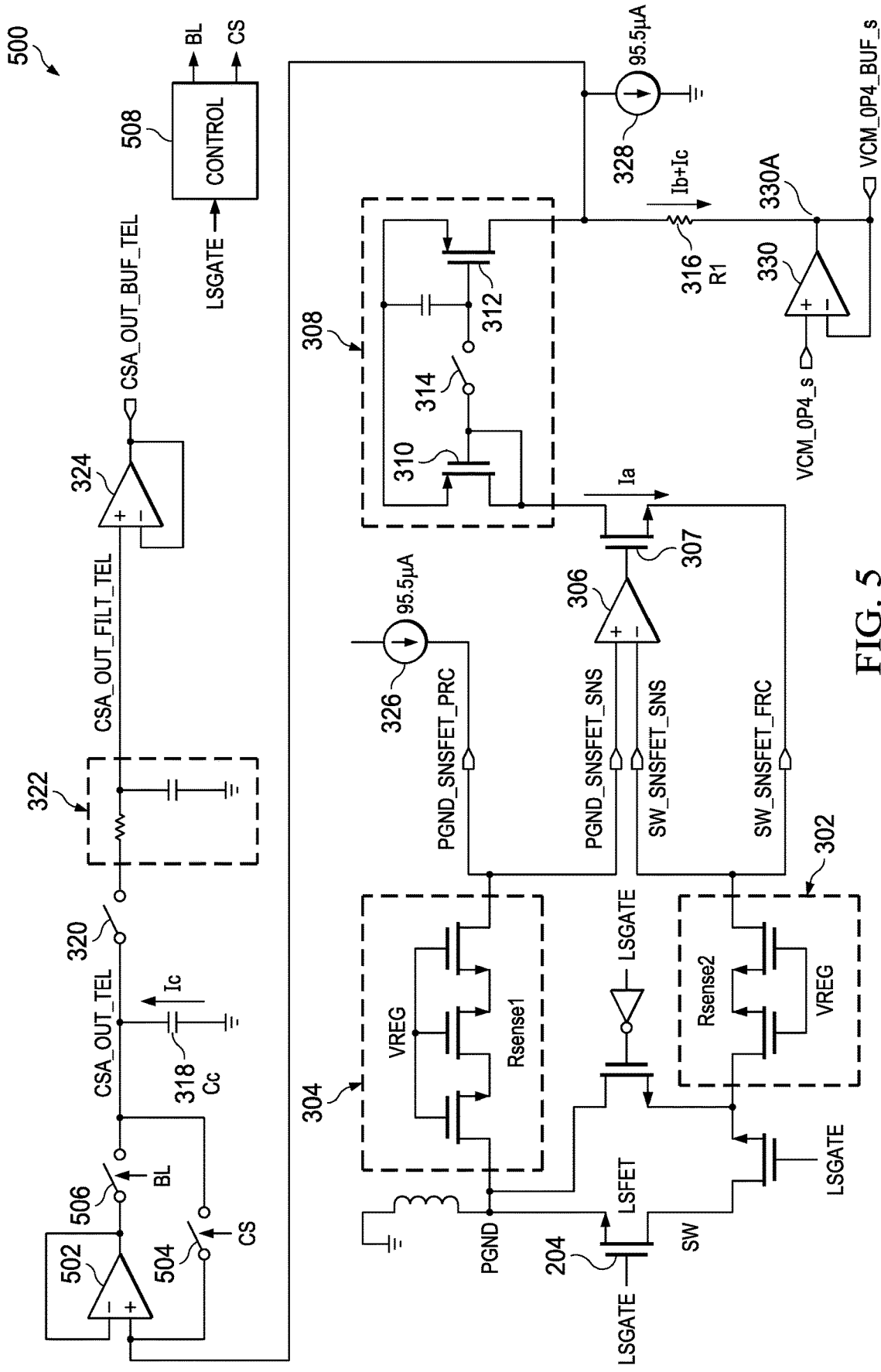
FIG. 5 shows a schematic level diagram for an example current sense circuit that includes compensation for blanking.

FIG. 5 shows a schematic level diagram for an example current sense circuit 500 that includes compensation for blanking. The current sense circuit 500 is similar to the current sense circuit 300, and includes a buffer amplifier 502, a switch 504, and a switch 506 to facilitate charging of the compensation capacitor 318. An input of the buffer amplifier 502 is coupled to the current mirror circuit 308 and the resistor 316. The output of the buffer amplifier 502 is coupled to a first terminal of the switch 506. A second terminal of the switch 506 is coupled to the compensation capacitor 318, and to a first terminal of the switch 504. A second terminal of the switch 504 is coupled to the input of the buffer amplifier 502. The switch 504 and the switch 506 may be implemented using FETs in some examples of the current sense circuit 500.

During the blanking interval, the switch 506 is closed, and the compensation capacitor 318 is quickly charged from the output of the buffer amplifier 502. When the blanking interval expires, the switch 504 is closed and the compensation current (Ic) flows from the compensation capacitor 318 through the switch 504 and the resistor 316 to boost the sense voltage.

The current sense circuit 500 includes a control circuit 508 that generates control signals BL and CS for controlling the switch 504 and the switch 506. The control signal BL defines the blanking interval (as shown in FIG. 4), and the control signal CS defines the active time of the low-side switching transistor 204 after the blanking interval (the averaging interval shown in FIG. 4).

Figure 6:
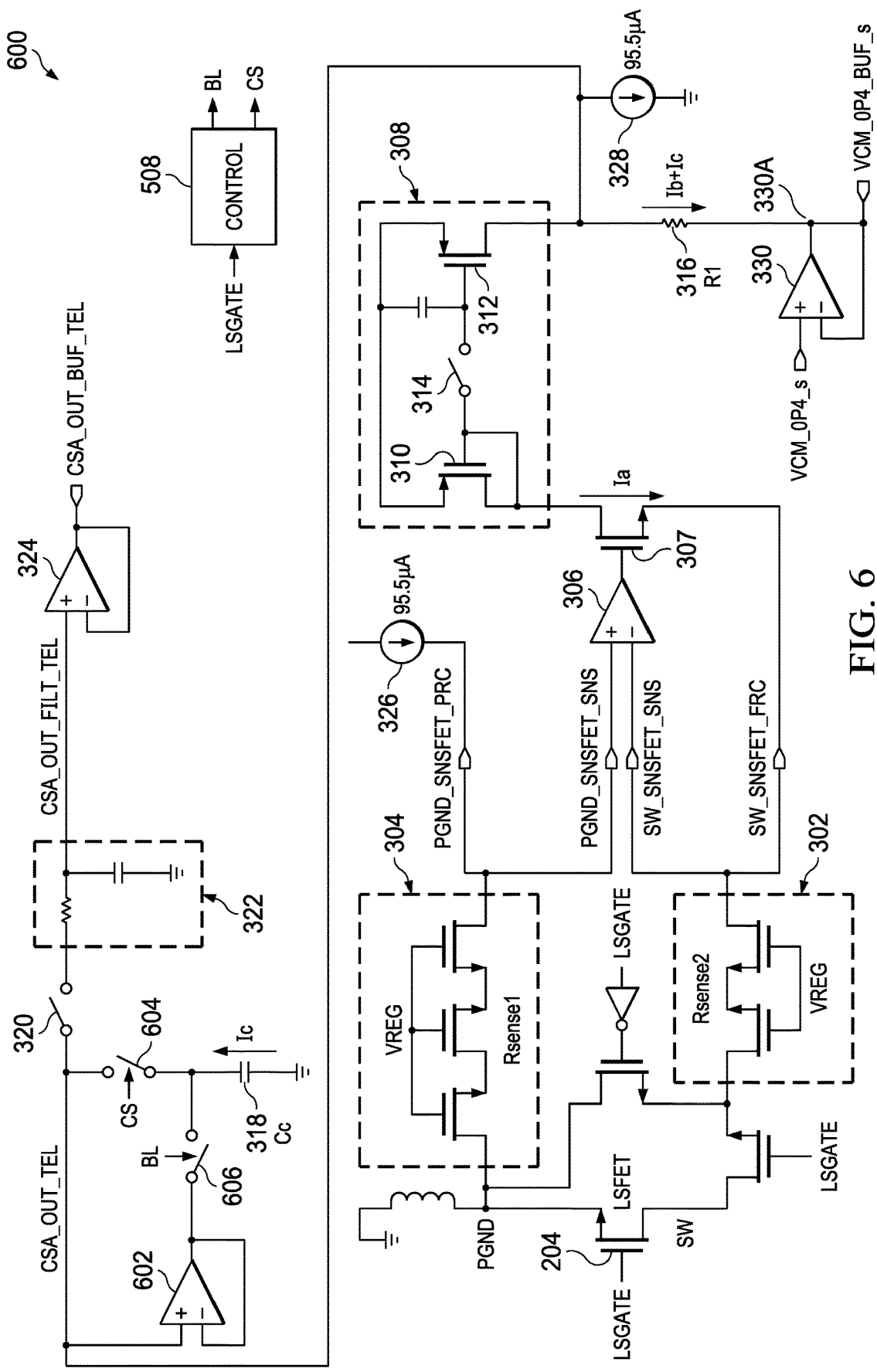
FIG. 6 shows a schematic level diagram for an example current sense circuit that includes compensation for blanking.

FIG. 6 shows a schematic level diagram for an example current sense circuit 600 that includes compensation for blanking. The current sense circuit 600 is similar to the current sense circuit 300 and the current sense circuit 500. Like the current sense circuit 500, the current sense circuit 600 includes a buffer amplifier 602, a switch 604, and a switch 606 to facilitate charging of the compensation capacitor 318. An input of the buffer amplifier 602 is coupled to the current mirror circuit 308 and the resistor 316. The output of the buffer amplifier 602 is coupled to a first terminal of the switch 606. A second terminal of the switch 606 is coupled to the compensation capacitor 318, and to a first terminal of the switch 604. A second terminal of the switch 604 is coupled to the input of the buffer amplifier 602 and a terminal of the switch 320. The switch 604 and the switch 606 may be implemented using FETs in some examples of the current sense circuit 600.

During the blanking interval, the switch 606 is closed, and the compensation capacitor 318 is quickly charged from the output of the buffer amplifier 602. When the blanking interval expires, the switch 604 is closed and the compensation current (Ic) flows from the compensation capacitor 318 through the switch 604 and the resistor 316 to boost the sense voltage.

Figure 7:
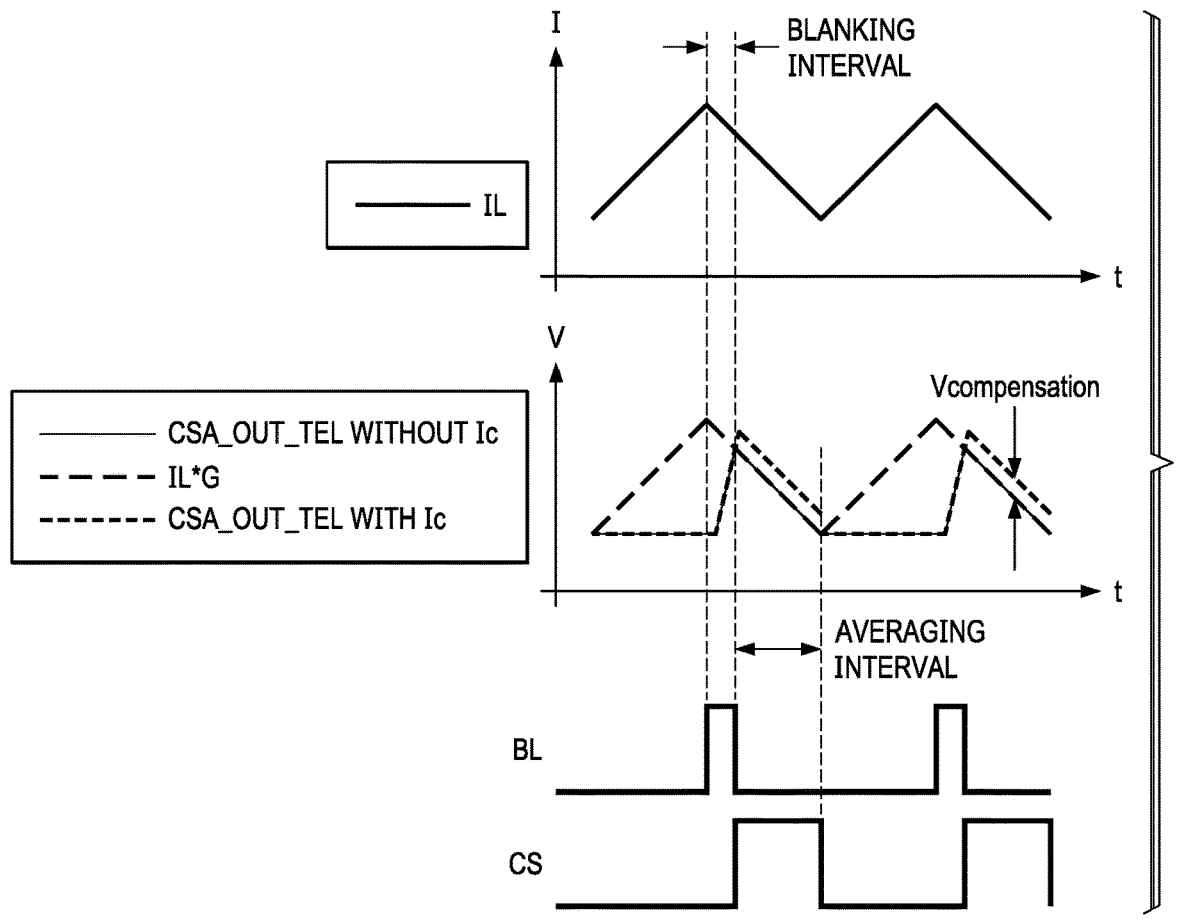
FIG. 7 shows a graph of current sensing with compensation for blanking, and switch control signals.

FIG. 7 shows a graph of current sensing with compensation for blanking, and switch control signals BL and CS generated by the control circuit 508. The switch control signals BL and CS control the switch 504 and switch 506 in the current sense circuit 500, and switch 604 and switch 606 in the current sense circuit 600.

In this description, the term "couple" or "couples" may cover connections, communications, or signal paths that enable a functional relationship consistent with this description. For example, if device A generates a signal to control device B to perform an action: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A. Also, in this description, the recitation "based on" means "based at least in part on." Therefore, if X is based on Y, then X may be a function of Y and any number of other factors.

Modifications are possible in the described embodiments, and other embodiments are possible, within the scope of the claims.

What is claimed is:

1. A current sense circuit, comprising:
a sense amplifier having a sense amplifier input and a sense amplifier output, wherein the sense amplifier input is adapted to be coupled to a transistor;
a current mirror circuit coupled to the sense amplifier output;
a buffer amplifier having a buffer amplifier input and a buffer amplifier output, wherein the buffer amplifier input is coupled to the current mirror circuit;
a first switch having first and second switch terminals, wherein the first switch terminal is coupled to the buffer amplifier output;
a compensation capacitor coupled to the second switch terminal;
a second switch having third and fourth switch terminals, wherein the third switch terminal is coupled to the second switch terminal, and the fourth switch terminal is coupled to the buffer amplifier input;
a low-pass filter; and
a third switch having fifth and sixth switch terminals, wherein the fifth switch terminal is coupled to the compensation capacitor, and the sixth switch terminal is coupled to the low-pass filter.

2. The current sense circuit of claim 1, wherein the buffer amplifier is a first buffer amplifier, and the current sense circuit is further comprising a second buffer amplifier having a second buffer amplifier input coupled to the low-pass filter.

3. The current sense circuit of claim 1, further comprising a current source coupled to the buffer amplifier input.

4. The current sense circuit of claim 1, further comprising a resistor coupled between the buffer amplifier input and a common-mode voltage terminal.

5. A current sense circuit, comprising:
a sense amplifier adapted to be coupled to a switching transistor of a DC-DC converter;
a current mirror circuit coupled to the sense amplifier, and configured to generate a sense current proportional to a current flowing through the switching transistor;
a resistor coupled to the current mirror circuit, and configured to generate a sense voltage based on the sense current;
a low-pass filter coupled to the resistor, and configured to average the sense voltage over an averaging interval;
a capacitor coupled to the resistor, and configured to:
store the sense voltage during a blanking interval that precedes the averaging interval; and
provide a compensation current during the averaging interval.

6. The current sense circuit of claim 5, further comprising a buffer amplifier coupled to the resistor and the capacitor, and configured to charge the capacitor during the blanking interval.

7. The current sense circuit of claim 6, further comprising a switch configured to couple an output of the buffer amplifier to the capacitor.

8. The current sense circuit of claim 7, wherein:
the switch is a first switch; and
the current sense circuit includes a second switch configured to couple an input of the buffer amplifier to the capacitor.

9. The current sense circuit of claim 8, further comprising:
a third switch configured to couple the capacitor to the low-pass filter;
wherein the second switch is configured to couple the capacitor to the third switch.

10. The current sense circuit of claim 9, further comprising a control circuit configured to:
close the first switch and open the second switch during the blanking interval; and
open the first switch and close the second switch during the averaging interval.

11. The current sense circuit of claim 10, wherein the control circuit is configured to close the third switch during the averaging interval.

12. A DC-DC converter, comprising:
a switching transistor;
a current sense circuit coupled to the switching transistor, and configured to sense current flow in the switching transistor, the current sense circuit including:
a sense amplifier coupled to the switching transistor;
a current mirror circuit coupled to the sense amplifier, and configured to generate a sense current proportional to a current flowing through the switching transistor;
a resistor coupled to the current mirror circuit, and configured to generate a sense voltage proportional to the sense current;
a low-pass filter coupled to the resistor, and configured to average the sense voltage over an averaging interval;
a capacitor coupled to the resistor, and configured to:
store the sense voltage during a blanking interval that precedes the averaging interval; and
provide a compensation current during in the averaging interval; and
a buffer amplifier coupled to the resistor and the capacitor, and configured to charge the capacitor during the blanking interval.

13. The DC-DC converter of claim 12, further comprising a switch configured to couple an output signal from the buffer amplifier to the capacitor.

14. The DC-DC converter of claim 13, wherein:
the switch is a first switch; and
the current sense circuit includes a second switch configured to couple an input of the buffer amplifier to the capacitor.

15. The DC-DC converter of claim 14, further comprising:
a third switch configured to couple the capacitor to the low-pass filter;
wherein the second switch is configured to couple the capacitor to the third switch.

16. The DC-DC converter of claim 15, wherein the current sense circuit includes a control circuit configured to close the first switch and open the second switch during the blanking interval.

17. The DC-DC converter of claim 16, wherein the control circuit is configured to open the first switch and close the second switch during the averaging interval.

18. The DC-DC converter of claim 17, wherein the control circuit is configured to close the third switch during the averaging interval.

* * * * *